June 28, 1932.  S. SCHRAGO  1,864,946
MOVABLE PROJECTION SCREEN
Filed April 18, 1928   2 Sheets-Sheet 1

INVENTOR
SAMUEL SCHRAGO
BY Hazard and Miller
ATTORNEYS

June 28, 1932.   S. SCHRAGO   1,864,946
MOVABLE PROJECTION SCREEN
Filed April 18, 1928   2 Sheets-Sheet 2
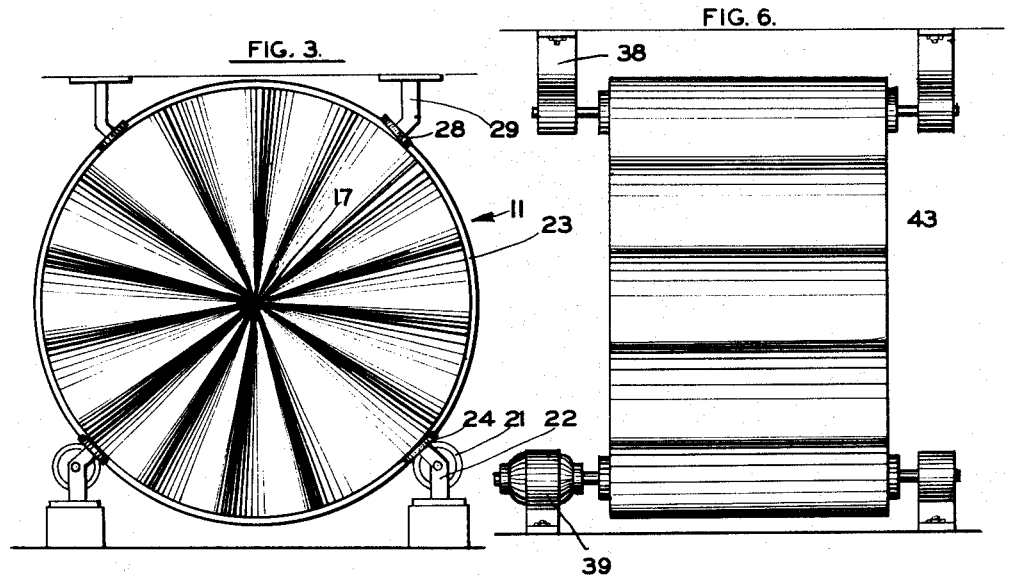
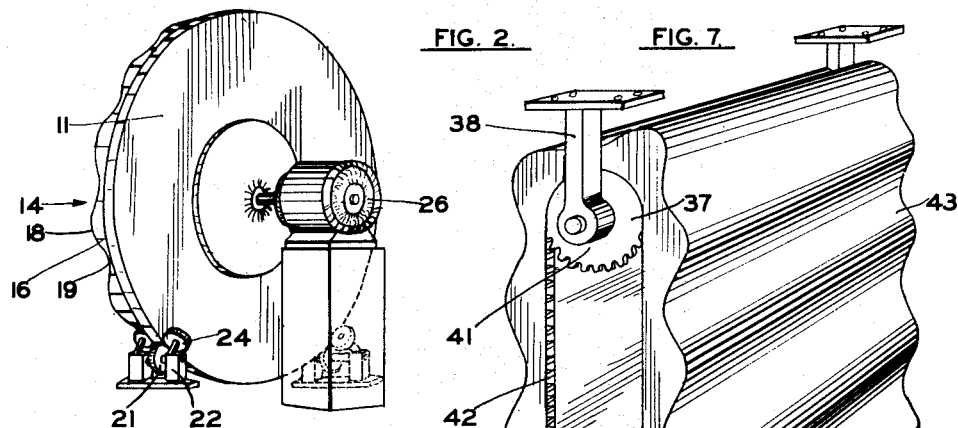
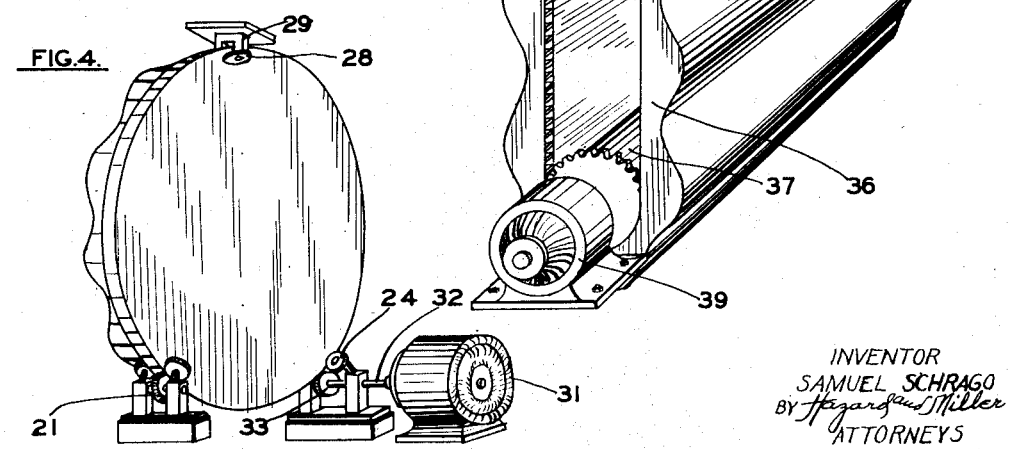
INVENTOR
SAMUEL SCHRAGO
BY *Hazard and Miller*
ATTORNEYS Patented June 28, 1932

1,864,946

UNITED STATES PATENT OFFICE

SAMUEL SCHRAGO, OF LOS ANGELES, CALIFORNIA

MOVABLE PROJECTION SCREEN

Application filed April 18, 1928. Serial No. 271,050.

This invention relates to projection screens.

An object of the invention is the provision of a projection screen mounted in such a manner that it is movable in the plane of the screen while an image is projected thereupon.

Another object is the provision of a movable projection screen, the projection surface of which is other than perfectly flat as has heretofore been the case.

A more detailed object is the provision of a movable projection screen having a plurality of similar corrugations or other protrusions upon that continuous surface of the screen which receives the projected image from any type of projection camera or other device adapted to cast rays of light in predetermined arrangement to produce a projected image of objects or characters.

The invention possesses other objects and features of advantage, some of which, with the foregoing, will be set forth in the following description of the preferred form of the invention which is illustrated in the drawings accompanying and forming part of the specification. It is to be understood that I do not limit myself to the showing made by the said drawings and descriptions, as I may adopt variations of the preferred form within the scope of my invention as set forth in the claims.

Referring to the drawings:

Fig. 2 is a perspective view of the projection screen of Fig. 1, taken from the rear and one side thereof.

Fig. 3 is a front elevation of a projection screen similar to that of Figs. 1 and 2, having a modified form of supporting mounting.

Fig. 4 is a rear and side perspective view of a screen similar to that of Figs. 1, 2, and 3, but having a still further modified form of mounting.

Fig. 6 is a front elevation of the screen of Fig. 5.

Fig. 7 is a perspective view of the screen of Figs. 5 and 6, taken from the front and one side thereof.

Figure 1:
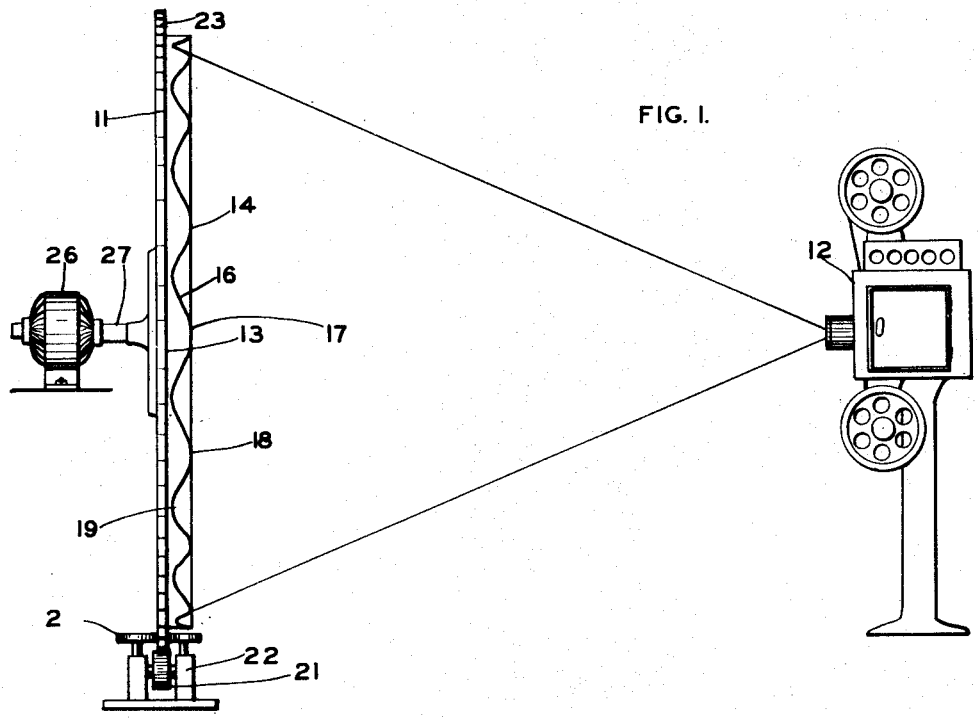
Figure 1 is a side elevation of one form of the projection screen of my invention, in position before a moving picture camera to receive the image cast thereby.

In terms of broad inclusion, the projection screen of the present invention is mounted in any convenient manner to be moved in the plane thereof at any desired speed during the time that an image is projected thereupon from any projection device. That surface of the screen upon which the image is cast, is provided with a plurality of preferably uniform projections such as domed or flat-topped protrusions or corrugations which may extend in parallelism or in crisscross arrangement, or which may radiate from a common center.

As a result of moving the screen substantially perpendicularly to the path of travel of the rays of light from the projection device, the image cast upon the screen appears to be brought out in bold relief in close simulation of natural vision.

In greater detail, one modification of my improved projection screen is shown in Figs. 1 to 4 inclusive, wherein a rigid disc 11 is arranged before a moving picture camera 12 or any other type of projection device. That surface 13 of the disc 11 facing the camera 12, is provided with a raised surface 14, in which a plurality of radiating corrugations 16 are provided. The corrugations 16 radiate from the center 17 of the disc and are all of uniform size and shape. All the corrugations 16 decrease in depth and width from the edge of the disc 11 to the center 17. In other words, the distance separating the plane of the tops 18 of the corrugations and the plane of the bottoms 19 at the edge of the disc, is considerably greater than the corresponding distance at the center 17 of the disc. In fact, the corrugations are so nearly flat at the center of the disc that the tops and bottoms of all the corrugations are substantially in the same plane.

Means for supporting and rotating the disc 11 and projection surface 14, in the plane of the disc and about an axis passing through the center 17, are provided. In Figs. 1 to 4 inclusive, the same type of disc 11 and projection surface 14 is shown equipped with several modified forms of mounting and driving means.

In Figs. 1 and 2, the disc is shown supported upon a plurality of rollers 21 which are mounted for rotation below the disc and in the plane thereof, upon suitable bearing blocks 22. These rollers 21 take the weight of the disc 11 and projection surface 14. The edge of the disc 11 is extended a short distance beyond the edge of the projection surface 14, leaving a radiating flange 23.

A plurality of rollers 24 are mounted with their edges bearing against both sides of the flange 23 so as to steady the disc 11 as it rotates, the rollers 24 being also revolubly mounted upon the blocks 22.

A motor 26 is operatively connected to the disc 11 by a shaft 27 extending concentrically from the disc, with the result that when the motor 26 is energized, the disc 11 is rotated upon the rollers 21, with the rollers 24 serving to maintain the disc 11 in a single plane.

As a result of projecting an image upon the projection surface 14 which is in motion, and which is provided with protrusions as described, an optical illusion is produced which gives the same effect as though a phantom veil or mist were hung before a flat surface and then the image from the camera 12 projected through the veil upon the surface. This results from the fact that the surface is continuous and the bottoms 19 of the corrugations, give the effect of the flat surface; while the tops 18 produce a surface which is intermittent, permitting the apparently continuous surface of the bottoms 19 to be observed therethrough. The image thus projected has perspective imparted to it, with the result that the picture produced is exceedingly realistic, so close is the simulation to natural vision.

The form of mounting shown in Fig. 3 is the same as that of Figs. 1 and 2, in that it includes the supporting rollers 21 and guide rollers 24 revolubly mounted upon the bearing blocks 22 to position the rollers 21 and 24 in their respective positions about the flange 23. However, supplementary guide rollers 28 are retained in position by brackets 29 against the flange 23 at the upper portion of the disc 11, serving as an additional means for securely holding the disc 11 in a single plane while being rotated.

Fig. 4 shows a modified form of driving means wherein the same supporting rollers 21 and guide rollers 24 and 28 are employed; but where the motor 31 is connected by a shaft 32 to one of the supporting rollers 33, with the result that the speed of rotation of the disc 11 is materially reduced as a motor of the same speed is employed. Since it is necessary to rotate the screen at only about 100 R. P. M. to produce the illusion desired, this feature is possessed of distinct advantages.

Figure 5:
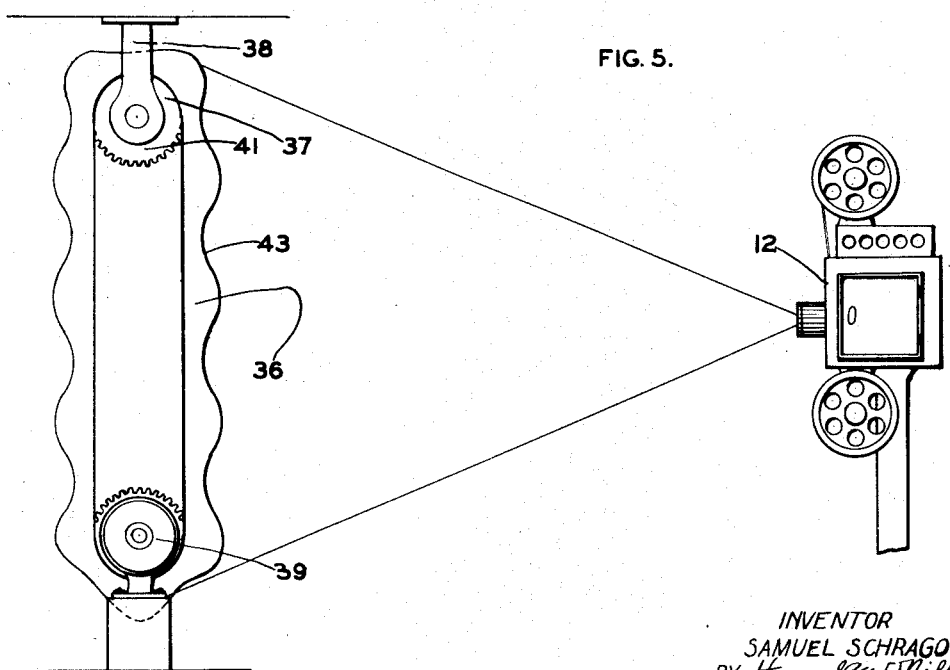
Fig. 5 is a side elevation of a modified form of my projection screen in position before a moving picture camera.

Figs. 5, 6, and 7 disclose a modified form of screen which is composed of an endless flexible belt 36, stretched upon a pair of spaced parallel rollers 37 which are journalled in suitable brackets 38. A motor 39 is connected to one of the rollers 37 in order to cause the belt 36 to travel upon the rollers. Each of the rollers 37 is provided with a sprocket 41 preferably at each end of each roller, and each pair of sprockets has a chain 42 engaged thereupon, with the result that undue stress is not imposed upon the belt 36. This prevents the possibility of distorting the belt 36.

The outer surface of the belt 36 is provided with a plurality of parallel corrugations 43 which are uniform in size and shape. It is obvious that by energizing the motor 39, the same effect will be produced when an image is projected upon the outer surface of the belt 36, as that gained when employing the disc and radiating corrugations previously described.

As indicated upon the several figures showing various modifications of my improved projection screen, the corrugations are of material depth and width, thereby differentiating from projection screens composed of pile fabric or the like, or having minute corrugations. Moreover, an entirely different effect is produced by employing these relatively large and deep corrugations, inasmuch as they produce the illusion of a plurality of semi-transparent screens spaced one in front of the other, and onto all of which the image is projected, thereby imparting a stereopticon effect or appearance of depth to the projected image.

I claim:

1. In the art described, a movable projection screen having a continuous projection surface and a plurality of protrusions on said surface, said protrusions being flat-topped, and means for moving said screen substantially in the plane of said surface.

2. In the art described, a pair of parallel rollers revolubly mounted in spaced relationship, an endless flexible belt carried by said rollers, and means for turning at least one of said rollers to move the belt thereon, said belt having a continuous projection surface and a plurality of corrugations thereon extending transversely with respect to the direction of motion of said belt, said corrugations being flat-topped.

In testimony whereof I have signed my name to this specification.

S. SCHRAGO.